(12) United States Patent
Uchino et al.

(10) Patent No.: US 8,109,814 B2
(45) Date of Patent: Feb. 7, 2012

(54) WIND TURBINE GENERATOR SYSTEM

(75) Inventors: Takashi Uchino, Nagasaki (JP);
Shinsuke Sato, Nagasaki (JP);
Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 169 days.

(21) Appl. No.: 12/377,898

(22) PCT Filed: Oct. 30, 2008

(86) PCT No.: PCT/JP2008/069805
§ 371 (c)(1),
(2), (4) Date: Feb. 18, 2009

(87) PCT Pub. No.: WO2010/013362
PCT Pub. Date: Feb. 4, 2010

(65) Prior Publication Data
US 2010/0127502 A1    May 27, 2010

(30) Foreign Application Priority Data

Jul. 28, 2008  (JP) ................................ 2008-193948

(51) Int. Cl.
*H05K 5/00* (2006.01)
*F03D 9/00* (2006.01)

(52) U.S. Cl. ............................ 454/184; 290/44; 290/55

(58) Field of Classification Search .................. 454/116, 454/128, 133, 136, 138, 184, 277; 290/55, 290/44
See application file for complete search history.

(56) References Cited

U.S. PATENT DOCUMENTS

| | | | | |
|---|---|---|---|---|
| 1,592,841 A | * | 7/1926 | Ansell | 454/136 |
| 2,839,986 A | * | 6/1958 | Herman | 454/136 |
| 3,733,996 A | * | 5/1973 | Naccarato et al. | 454/76 |
| 3,771,430 A | * | 11/1973 | Lane | 454/277 |
| 3,788,264 A | * | 1/1974 | Gibson | 440/88 R |

(Continued)

FOREIGN PATENT DOCUMENTS

JP          58-022835 A      2/1983

(Continued)

OTHER PUBLICATIONS

Online Article—"How Does A Wind Turbine Generate Electricity?", located at http://www.articlesnatch.com/Article/How-Does-A-Wind-Turbine-Generate-Electricity-/826166 (accessed Jul. 28, 2010).*

(Continued)

*Primary Examiner* — Steven B McAllister
*Assistant Examiner* — Frances H Kamps
(74) *Attorney, Agent, or Firm* — Kanesaka Berner & Partners, LLP

(57) ABSTRACT

Provided is a wind turbine generator system that can cool a nacelle interior by ventilation irrespective of the outside air temperature in various installation environments. In a wind turbine generator system in which equipment of drive and electricity generation mechanisms that are coupled to a rotor head provided with wind turbine blades is disposed inside a nacelle, and in which, by driving a ventilation fan provided in the nacelle, outside air introduced from an air inlet provided in a front face of the nacelle is exhausted outside the nacelle from an air outlet that communicates with a fan outlet, to perform ventilation cooling of the interior, a side air inlet is additionally provided in a side face of the nacelle at a position where a negative pressure is generated by air flowing outside the nacelle.

17 Claims, 12 Drawing Sheets

U.S. PATENT DOCUMENTS

| | | | |
|---|---|---|---|
| 4,193,339 A * | 3/1980 | Giles | 454/136 |
| 4,830,135 A * | 5/1989 | Yamashita | 180/229 |
| 4,958,555 A * | 9/1990 | Lentz et al. | 454/277 |
| 6,579,168 B1 * | 6/2003 | Webster et al. | 454/184 |
| 6,676,122 B1 * | 1/2004 | Wobben | 290/55 |
| 7,161,260 B2 * | 1/2007 | Kruger-Gotzmann et al. | 290/55 |
| 7,427,814 B2 * | 9/2008 | Bagepalli et al. | 290/55 |
| 7,448,461 B2 * | 11/2008 | Misaki et al. | 180/68.4 |
| 7,513,328 B2 * | 4/2009 | Shigeta et al. | 180/225 |
| 7,843,080 B2 * | 11/2010 | Jansen | 290/55 |
| 8,016,569 B2 * | 9/2011 | Stam et al. | 416/245 R |
| 2007/0004329 A1 * | 1/2007 | Miyakawa et al. | 454/299 |
| 2007/0222223 A1 | 9/2007 | Bagepalli et al. | |
| 2007/0238407 A1 * | 10/2007 | Nottke et al. | 454/164 |
| 2008/0197638 A1 * | 8/2008 | Wobben | 290/55 |
| 2009/0111370 A1 * | 4/2009 | Porte et al. | 454/76 |
| 2010/0061853 A1 * | 3/2010 | Bagepalli | 416/95 |
| 2011/0127369 A1 * | 6/2011 | Dussol et al. | 244/54 |
| 2011/0187119 A1 * | 8/2011 | McMaster | 290/55 |

FOREIGN PATENT DOCUMENTS

| | | |
|---|---|---|
| JP | 58-065977 | 4/1983 |
| JP | 06123461 A * | 5/1994 |
| JP | 2007-002773 A | 1/2007 |
| JP | 2008513665 T | 5/2008 |
| WO | 2006032515 A1 | 3/2006 |

OTHER PUBLICATIONS

Search Report of International Application No. PCT/JP2008/069805 mailed Jan. 27, 2009.

* cited by examiner

US 8,109,814 B2

WIND TURBINE GENERATOR SYSTEM

CROSS-REFERENCE TO RELATED APPLICATIONS

The present Application is based on International Application No. PCT/JP2008/069805, filed on Oct. 30, 2008, which in turn corresponds to Japanese Application No. 2008-193948 filed on Jul. 28, 2008, and priority is hereby claimed under 35 USC §119 based on these applications. Each of these applications are hereby incorporated by reference in their entirety into the present application.

TECHNICAL FIELD

The present invention relates to a wind turbine generator system using a windmill that converts natural wind power to rotary power for generating electricity.

BACKGROUND ART

Wind turbine generator systems generating electricity using wind power, which is natural energy, have been conventionally known. This type of wind turbine generator system includes, for example, like the wind turbine generator system 1 shown in FIG. 3, a rotor head 4 to which wind turbine blades 5 are attached, a main shaft coupled to the rotor head 4 so as to integrally rotate with the rotor head 4, a step-up gear coupled to the main shaft that rotates by means of wind power received by the wind turbine blades 5, and a generator driven by a shaft output from the step-up gear, which are provided in a nacelle 3 mounted atop a tower 2.

In the thus-configured wind turbine generator system 1, the rotation of the main shaft and the rotor head 4 provided with the wind turbine blades 5 that convert wind power to rotary power generates shaft output. The output of the shaft whose rotational speed is stepped-up by the step-up gear coupled to the main shaft is transmitted to the generator. Accordingly, the shaft output obtained by converting wind power to rotary power works as the driving source of the generator, and thereby electricity can be generated using wind power as the motive energy of the generator.

In the above-mentioned wind turbine generator system 1, for example, as shown in FIG. 14, equipment E such as the step-up gear, the generator, and a controller is disposed inside the nacelle 3. This equipment E generates heat during operation, which causes an increase in the internal temperature. Accordingly, the nacelle 3 is provided with a ventilator for cooling the inside, whose temperature is increased due to the heat generated by the equipment E, to prevent the equipment E from being damaged by an increase in temperature to a specified temperature or more.

This ventilator includes an air inlet 31 provided on the front face of the nacelle 3, an air outlet 32 provided on the upper portion of the rear of the nacelle 3, and a ventilation fan (not shown) provided at the air inlet 31. The front face of the nacelle 3, which is provided with the air inlet 31, is the position where the dynamic pressure of the air flowing outside is the maximum.

The above-mentioned air inlet 31 is provided with, for example, a louver 33 having a configuration as shown in FIG. 15. The louver 33 shown in the drawing has a channel structure for preventing infiltration of rainwater into the nacelle 3. Comparing the intake air flowing from the outside of the nacelle toward the inside of the nacelle and the exhaust air flowing from the inside of the nacelle toward the outside of the nacelle, the channel resistances (pressure losses Δp) in both flow directions are the same.

In addition, in a wind turbine generator system in which a generator is stored in a hermetically-sealed case, a cooling mechanism has been proposed for forcibly ventilating the inside of the case using an air inlet provided in the case at the bottom end face side of the generator and an air outlet provided at an end at the front face of the case and driving a fan disposed near the air outlet in the case (for example, see Patent Document 1).

Patent Document 1: Japanese Unexamined Patent Application, Publication No. SHO-58-65977 (see FIG. 2)

DISCLOSURE OF INVENTION

The above-described conventional wind turbine generator system 1 is provided with the air inlet 31 in the front face of the nacelle 3, and ventilation cooling is performed by air intake and exhaust with a ventilation fan. However, such ventilation cooling may not realize sufficient cooling performance depending on the installation environment of the wind turbine generator system 1 or the season.

When the installation site of the wind turbine generator system 1 is a temperate region, a sufficient air flow necessary for cooling the equipment E may not be ensured only by the air inlet 31 provided in the front of the nacelle 3. In such an installation site, damage caused by an increase in the temperature of the equipment E is a problem.

When the installation site of the wind turbine generator system 1 is a cool region, since the inside of the nacelle 3 communicates with the atmosphere through the air inlet 31 and the air outlet 32 even if the operation is stopped, the surrounding temperature of the equipment E in the nacelle 3 is decreased. Therefore, the surrounding temperature of the equipment E may decrease to a low temperature of −20° C. or less depending on the environment of the cool region, which may hinder the behavior of the equipment E when the operation is restarted, causing damage to the equipment E. To give a concrete example, a low temperature inside the nacelle 3 decreases the temperature of oils that are supplied to sliding portions of the equipment E for cooling and lubrication, resulting in an increase in viscosity. Since such an increase in the viscosity of the oils increases the load when a pump is started, smooth starting of the pump is difficult, and, in addition, the pump or an engine may be damaged.

Thus, in the wind turbine generator system 1 in which the inside of the nacelle 3 is cooled by ventilation, since the conditions, such as outside air temperature, vary depending on the installation site and the season, it is desired that the nacelle interior be cooled irrespective of the outside air temperature in various installation environments.

The present invention has been made under the above circumstances, and an object of the invention is to provide a wind turbine generator system where the nacelle interior can be cooled by ventilation irrespective of the outside air temperature in various installation environments.

The present invention employs the following solutions for solving the above-mentioned problems.

The wind turbine generator system of the present invention is a wind turbine generator system in which equipment of a drive mechanism and an electricity generation mechanism that are coupled to a rotor head provided with wind turbine blades is disposed inside a nacelle, and by driving a ventilation fan provided in the nacelle, outside air introduced from an air inlet provided in a front face of the nacelle is exhausted outside the nacelle from an air outlet that communicates with a fan outlet, to perform ventilation cooling of the interior, wherein a side air inlet is additionally provided in a side face of the nacelle at a position where a negative pressure is generated by air flowing outside the nacelle.

In such a wind turbine generator system, since the side air inlet is additionally provided in the side face of the nacelle at a position where a negative pressure is generated by air flowing outside the nacelle, the amount of outside air that is allowed to flow into the nacelle during operation is increased with the increase in the area of the air inlet, resulting in suppression of the temperature rise of the nacelle interior.

When the wind turbine generator system is not operated, the pressure of air flowing outside the nacelle becomes negative at the position where the side air inlet is provided. Therefore, the amount of outside air that flows into the nacelle from the additionally provided side air inlet can be minimized. Consequently, when the wind turbine generator system installed in a cool region is not operated, a temperature drop of the nacelle interior can be suppressed.

In such a case, by arranging the additionally provided side air inlet in a side face of the nacelle at a lower position near the air inlet, outside air flowing in from the air inlet almost directly flows out from the side air inlet to be exhausted without circulating in the nacelle interior. Consequently, ventilation of the nacelle interior can be suppressed.

In the above-described wind turbine generator system, it is preferable that a rearward side air inlet be additionally provided in the side face of the nacelle at a position that is located rearward with respect to the side air inlet and where the negative pressure is eliminated, and switching means for selecting an open or closed state of the side air inlet and the rearward side air inlet be provided. With this, it is possible to select an air inlet to be opened according to the outside air temperature and use it for air intake or air exhaust.

In this case, the rearward side air inlet is preferably positioned at an upper rearward portion of the side face of the nacelle. Thus, when the outside air temperature is high, the upper rearward portion, where the temperature is high, inside the nacelle can be efficiently ventilated by opening the rearward side air inlet.

The switching means is preferably provided with a front supporting swing member that is attached to the side air inlet and is openable outward at the rear side of the nacelle by using the nacelle front side as a fulcrum and a rear supporting swing member that is attached to the rearward side air inlet and is openable outward at the front side of the nacelle using the nacelle rear side as a fulcrum. Thus, the air exhaust efficiency can be increased by opening the side air inlet to increase the negative pressure, and the air intake efficiency can be increased by opening the rearward side air inlet to scoop the outside air flow for taking in the air.

Furthermore, the wind turbine generator system of the present invention is preferably provided with a front hood member that is attached to the outside of the side air inlet and that is closed at the nacelle front side and opened at the nacelle rear side and a rear hood member that is attached to the outside of the rearward side air inlet and that is opened at the nacelle front side and closed at the nacelle rear side. By doing so, with the side air inlet open, the air exhaust efficiency can be increased by the increase in negative pressure caused by the front hood member, and with the rearward side air inlet open, the air intake efficiency can be increased by the rear hood member scooping the outside air flow for taking in the air.

In the above-described invention, the air inlet preferably includes a louver having a cross-sectional channel shape whose inlet opening area at the outflow side is larger than that at the inflow side. Thus, a pressure loss in the outflow can be made smaller than that in the inflow.

In this case, preferably, the cross-sectional channel shape inclines such that the shaft center line descends from the inflow side to the outflow side, and the wall forming the channel cross-section is provided with a gutter at a lower portion thereof. Accordingly, rain water tending to infiltrate via the louver to the nacelle interior can be drained outside.

In the above-described wind turbine generator system of the present invention, the nacelle interior can be cooled irrespective of the outside air temperature in various installation environments even if the conditions, such as the outside air temperature, vary depending on the installation site and the season. That is, when the temperature of the nacelle interior is increased, the inside can be cooled by efficient ventilation, and when the temperature of the nacelle interior is decreased in, for example, a cool region, a temperature drop can be minimized with reduced ventilation.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

EXPLANATION OF REFERENCE SIGNS

Figure 1A:
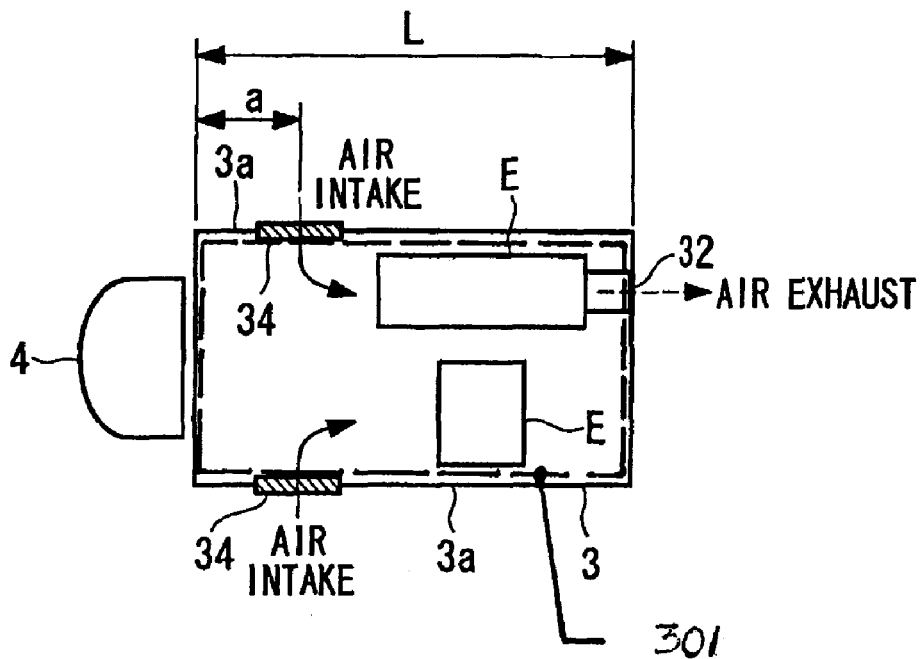
FIG. 1A is a plan view illustrating a nacelle configuration during operation in a first embodiment of a wind turbine generator system according to the present invention.

1: wind turbine generator system
3: nacelle
3a: nacelle side face
31: air inlet
32: air outlet
33, 40, 40A, 40B: louver
34: side air inlet
35, 35A: rearward side air inlet
36, 36A: door member
37a, 37b: door member

BEST MODE FOR CARRYING OUT THE INVENTION

An embodiment of the wind turbine generator system according to the present invention will be described below with reference to the drawings.

Figure 3:
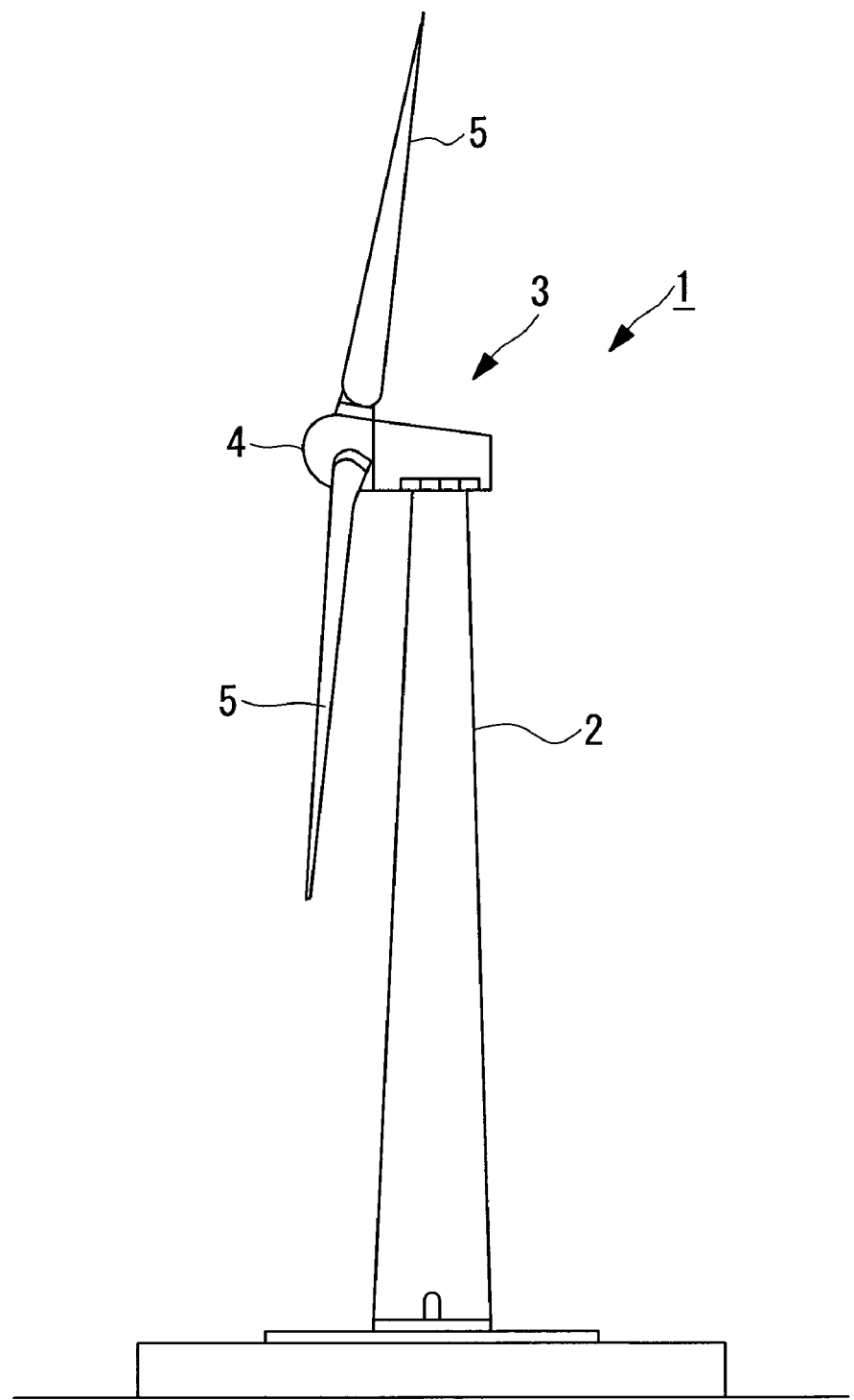
FIG. 3 is a view schematically illustrating a wind turbine generator system.

In the wind turbine generator system 1 shown in FIG. 3, a nacelle 3 is mounted atop a tower 2. A rotor head 4 to which wind turbine blades 5 are mounted is rotatably supported by the nacelle 3 at the front end side. Equipment, such as a main shaft (not shown) coupled to the rotor head 4 so as to integrally rotate therewith, a step-up gear (not shown) coupling to the main shaft that rotates by means of wind power received by the wind turbine blades 5, a generator (not shown) driven by a shaft output from the step-up gear, and a controller (not shown) conducting various controls, is disposed inside the nacelle 3.

In the thus-configured wind turbine generator system 1, the rotation of the main shaft and the rotor head 4 provided with the wind turbine blades 5 that convert wind power to rotary power generates shaft output. Accordingly, electricity can be generated by the generator driven via the step-up gear coupled to the main shaft, using wind power.

That is, in the above-described wind turbine generator system 1, equipment E, such as drive and electricity generation mechanisms coupled to the rotor head 4 provided with the wind turbine blades 5, is disposed inside the nacelle 3, and ventilation cooling of the inside of the nacelle is conducted by driving a ventilation fan (not shown) disposed at an appropriate position in the nacelle 3, e.g., in a region 301 schematically depicted in FIG. 1A, to introduce outside air from an air inlet 31 provided in the front face of the nacelle 3 and exhaust the air outside the nacelle 3 from an air outlet 32 that communicates with an outlet of the fan.

In a first embodiment of such a wind turbine generator system 1, which will be described below, for example, as shown in FIGS. 1A, 1B, 2A, and 2B, side air inlets 34 are additionally provided in the side faces of the nacelle at positions where a negative pressure is generated by outside air flowing outside the nacelle 3. These side air inlets 34 are provided on both side faces of the nacelle 3.

The air inlet 31 is an opening provided at a lower portion of the front face of the nacelle 3 and is provided with a louver 40 described below. The lower portion of the front face in this case is a region lower than the position where the rotor head 4 rotates and is approximately near the bottom face of the nacelle 3.

The air outlet 32 is an opening for exhausting air and is disposed at an upper portion of the rear end face of the nacelle 3. This air outlet 32 is coupled to the outlet of a ventilation fan, which is disposed, for example, near the center of the upper end face of the nacelle 3, through a duct extending rearward from the ventilation fan outlet.

The side air inlets 34 are provided at portions of the nacelle side faces 3a where the pressure is the minimum due to the influence of the outside air flow coming from the front of the nacelle 3. That is, the side air inlets 34 are provided at negative-pressure regions where the flow direction of the outside air flows coming from the front of the nacelle 3 are changed by being affected by the ends of the front face of the nacelle such that the flows are separated from the nacelle side faces 3a to decrease the pressure. These negative-pressure regions are, for example, as shown in FIG. 1A, each formed within a range of about 0.1 L to 0.3 L, as a result of simulation based on the shape of the nacelle 3 having a total length L. In the arrangement example shown in the drawing, when the length from the front end of the nacelle 3 to the central axis of the side air inlet 34 in the nacelle length direction is defined as a, the side air inlet 34 is disposed such that a=0.1 L to 0.3 L. Desirably, the entire side air inlet 34 is disposed within the range of 0.1 L to 0.3 L.

The additionally provided side air inlets 34 are desirably disposed near the air inlet 31 at lower portions of the nacelle side faces 3a, that is, as shown in FIGS. 1A, 1B, 2A, and 2B, disposed at rear positions so as to be at approximately the same level as the air inlet 31 so that the outside air flowing in from the air inlet 31 flows out without circulating in the nacelle interior.

Figure 1B:
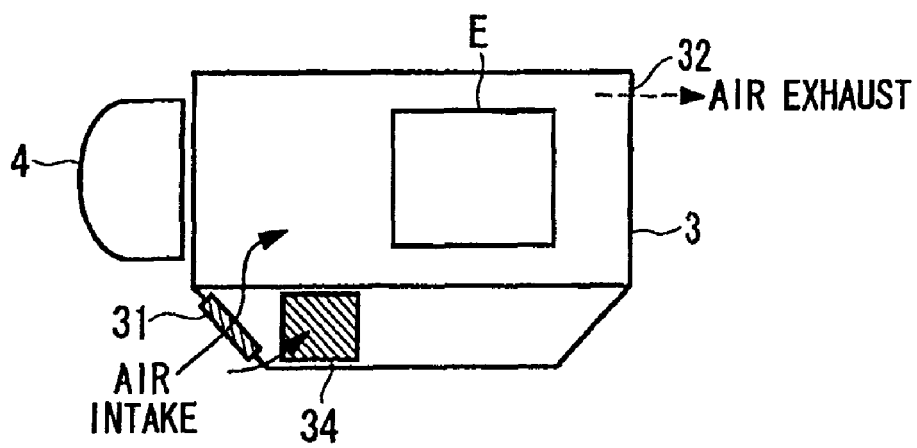
FIG. 1B is a side view illustrating a nacelle configuration during operation in the first embodiment of the wind turbine generator system according to the present invention.

In such a wind turbine generator system 1, the inside of the nacelle 3 is cooled by ventilation by driving a ventilation fan during operation for normal electricity generation. In this case, as shown in FIGS. 1A and 1B, outside air flows in the nacelle 3 from the air inlet 31 and the additionally provided side air inlets 34, circulates inside the nacelle 3, and flows out from the air outlet 32. That is, the additionally provided side air inlets 34 function so as to enlarge the opening area (air inlet area) for air intake.

As a result, a ventilation cooling channel is formed in the nacelle 3 so that the outside air taken from the air inlet 31 and the side air inlets 34 circulates inside the nacelle to cool the nacelle interior by ventilation and then is exhausted to the outside of the nacelle from the air outlet 32. Therefore, the amount of outside air that is introduced into the nacelle 3 during operation of the wind turbine generator system is increased with an increase in the air inlet area, resulting in suppression of the temperature rise of the nacelle interior. Though the positions where the side air inlets 34 are disposed are negative-pressure regions, since the ventilation fan is driven, a large negative pressure is generated inside the nacelle 3, and thereby a flow of outside air taken into the inside of the nacelle 3 is formed around the periphery of each of the side air inlets 34.

Figure 2A:
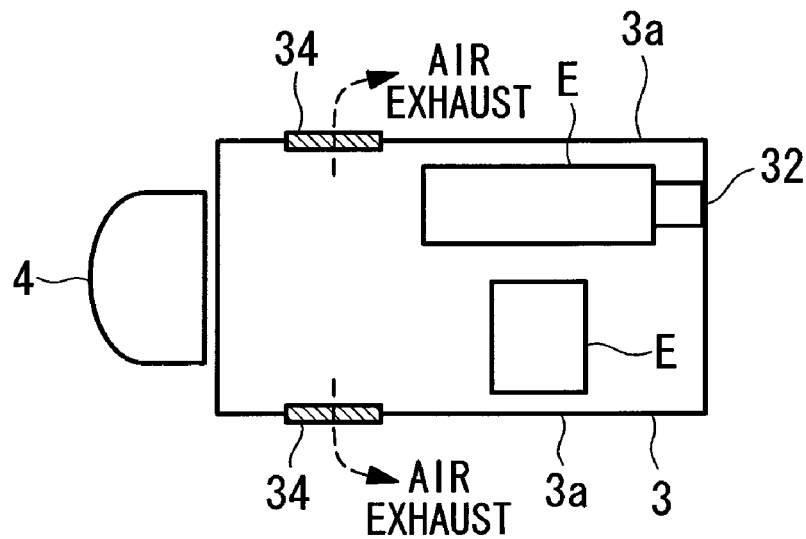
FIG. 2A is a plan view illustrating a nacelle configuration during a shutdown period in the first embodiment of the wind turbine generator system according to the present invention.
Figure 2B:
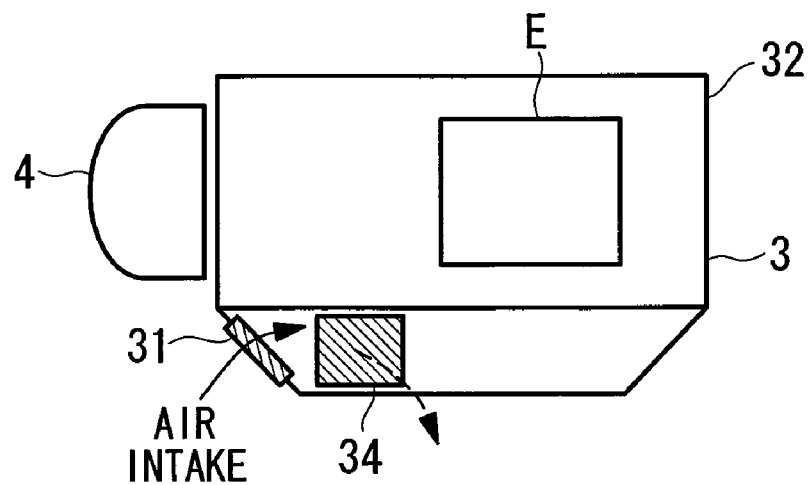
FIG. 2B is a side view illustrating a nacelle configuration during a shutdown period in the first embodiment of the wind turbine generator system according to the present invention.

On the other hand, when the wind turbine generator system 1 is not driven, the ventilation fan is also shut down. Since the side air inlets 34 are disposed at negative-pressure regions, as shown in FIGS. 2A and 2B, a suction force toward the nacelle interior is not generated in the periphery of each of the additionally provided side air inlets 34, and, in contrast, air is exhausted outside the nacelle where the pressure is negative. That is, in the state where the ventilation fan is not driven, the side air inlets 34 function as air outlets, but the negative pressure outside the nacelle generated in this state is much lower than the negative pressure generated by driving the ventilation fan.

Therefore, a relatively small flow of air flowing out from the nacelle interior to outside the nacelle is formed around each of the air inlets 34. By this air flow, the amount of outside air flowing into the nacelle interior can be minimized.

As a result, in the wind turbine generator system 1 installed in a cool region, since the ventilation caused by the inflow of low-temperature outside air into the nacelle interior during a shutdown period takes a long time, a temperature drop of the nacelle interior can be suppressed. In particular, by additionally providing the side air inlets 34 in lower portions of the nacelle side faces 3a near the air inlet 31, the outside air flowing in from the air inlet 31 almost directly flows out from the side air inlets 34 to the outside of the nacelle to be exhausted without circulating inside the nacelle 3. Consequently, ventilation of the inside of the nacelle can be further suppressed.

Next, a second embodiment of the wind turbine generator system according to the present invention will be described with reference to FIGS. 4A, 4B, 5A, and 5B. Portions similar to those in the above-described embodiment are denoted by the same reference numerals and their detailed description is omitted.

In this embodiment, the rearward side air inlets 35 are additionally provided at positions that are located rearward of the nacelle with respect to the above-described side air inlets 34 and are located in non-negative pressure regions, where the negative pressure is eliminated, of the nacelle side faces 3a. These rearward side air inlets 35 are each provided with, for example, a slidable door member 36, as switching means for selecting an open or closed state of the side air inlets 34 and the rearward side air inlets 35.

The slidable door members 36 are configured so as to be capable of selecting an open or closed state where only the side air inlets 34 or the rearward side air inlets 35 are opened by sliding in the front-back direction of the nacelle 3 between a first open or closed state in which the side air inlets 34 are opened and the rearward side air inlets 35 are closed and a second open or closed state in which the side air inlets 34 are closed and the rearward side air inlets 35 are opened.

In this embodiment, the side air inlets 34 are disposed at the same positions as in the above-described first embodiment.

Figure 4A:
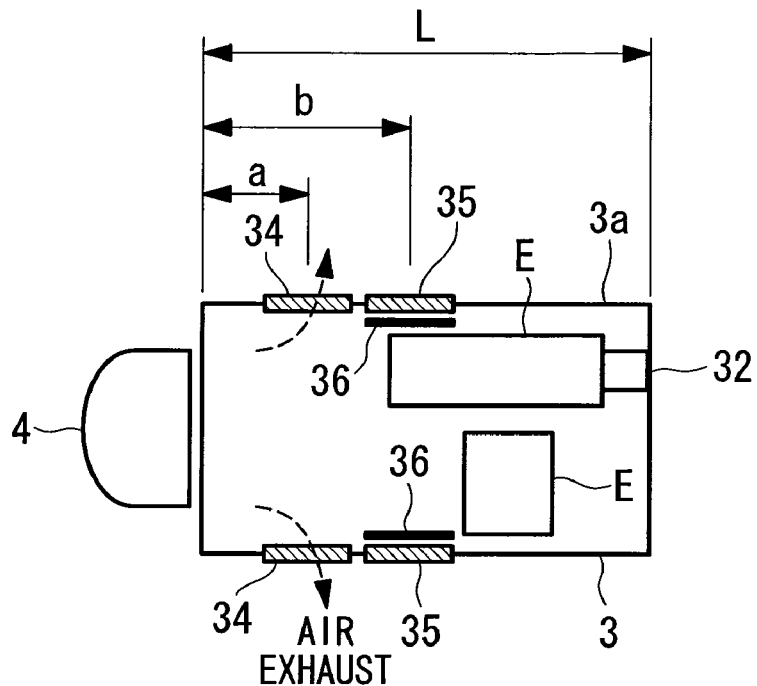
FIG. 4A is a plan view illustrating a nacelle configuration during a shutdown period at a low outside air temperature in a second embodiment of the wind turbine generator system according to the present invention.

The rearward side air inlets 35 are each disposed at a position (non-negative-pressure region) where the pressure is regained, i.e., a position that is located beyond a negative-pressure region where the flow direction of an outside air flow coming from the front of the nacelle 3 is changed by being affected by the front end face of the nacelle such that the flow is separated from the nacelle side face 3a to decrease the pressure. That is, as shown in FIG. 4A, the rearward side air inlets 35 are each formed within a range of about 0.5 L to 0.8 L, as a result of simulation based on the shape of the nacelle 3 having a length L. In the arrangement example shown in the drawing, when the length from the front end of the nacelle 3 to the central axis of the rearward side air inlet 35 in the nacelle length direction is defined as b, the rearward side air inlet 35 is disposed such that b=0.5 L to 0.8 L. Desirably, the entire rearward side air inlet 35 is disposed within the range of 0.5 L to 0.8 L.

With such a configuration, air inlets to be opened that are selected from the side air inlets 34 and the rearward side air inlets 35 can be used for air intake or air exhaust by manipulating the door members 36 according to the outside air temperature of the environment where the wind turbine generator system 1 is installed.

Figure 4B:
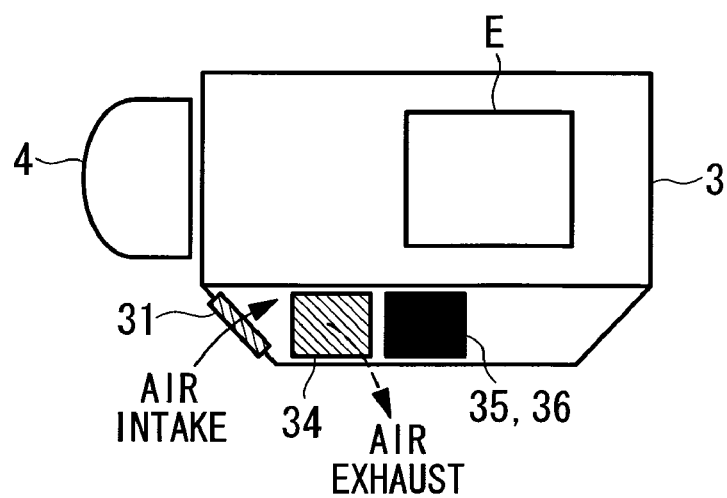
FIG. 4B is a side view illustrating a nacelle configuration during a shutdown period at a low outside air temperature in the second embodiment of the wind turbine generator system according to the present invention.

Concretely, when the outside air temperature of the installation environment is low, as shown in FIGS. 4A and 4B, the first open or closed state in which the side air inlets 34 are opened and the rearward side air inlets 35 are closed is selected by sliding the door members 36 toward the rear side of the nacelle. In this state, since the rearward side air inlets 35 are closed, it is substantially the same configuration as that in the above-described first embodiment in which the rearward side air inlets 35 are not provided.

Consequently, in the state where the wind turbine generator system 1 is not driven and the ventilation fan is also not driven, the side air inlets 34 function as air outlets. Therefore, relatively small flows of air flowing out from the nacelle interior to outside the nacelle are formed around the side air inlets 34. Due to these air flows, the amount of outside air flowing into the nacelle interior can be minimized.

As a result, in the wind turbine generator system 1 installed in a cool region, since it takes a long time for ventilating the nacelle interior by the inflow of low-temperature outside air during a shutdown period, a temperature drop of the nacelle interior can be suppressed.

Figure 5A:
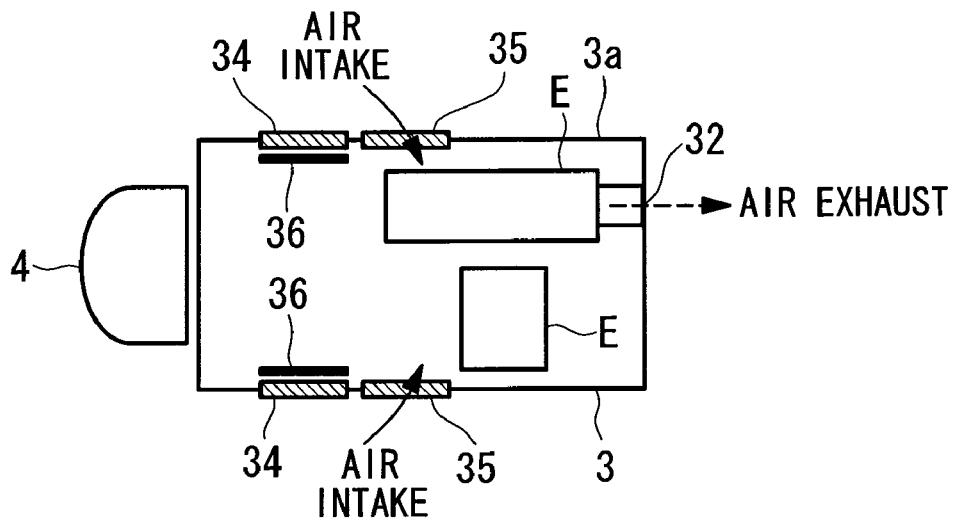
FIG. 5A is a plan view illustrating a nacelle configuration during operation at a high outside air temperature in the second embodiment of the wind turbine generator system according to the present invention.
Figure 5B:
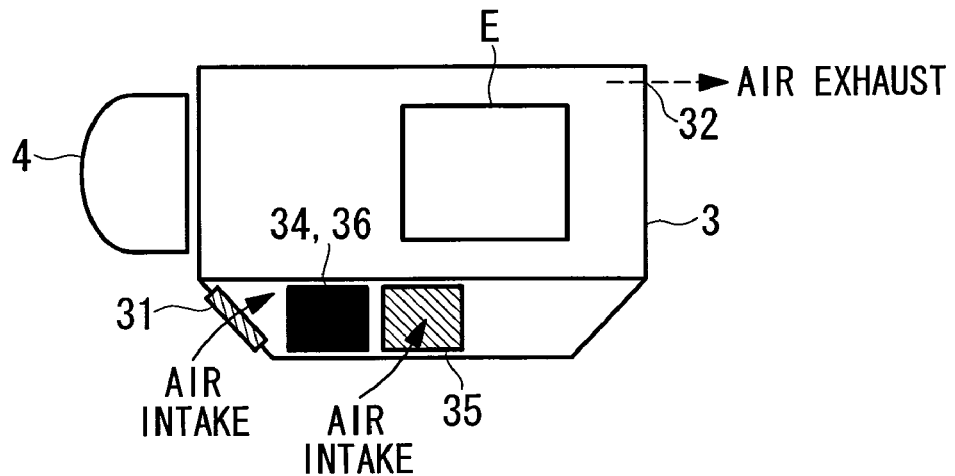
FIG. 5B is a side view illustrating a nacelle configuration during operation at a high outside air temperature in the second embodiment of the wind turbine generator system according to the present invention.

On the other hand, when the outside air temperature of the installation environment is high, as shown in FIGS. 5A and 5B, the second open or closed state in which the side air inlets 34 are closed and the rearward side air inlets 35 are opened is selected by sliding the door members 36 toward the front side of the nacelle. In this state, since the rearward side air inlets 35 are opened, the rearward side air inlets 35 disposed at the non-negative-pressure regions function as air inlets.

Consequently, in a normal driving state where the wind turbine generator system 1 and the ventilation fan are driven, since the rearward side air inlets 35, in addition to the air inlets 31, function as air inlets, the cooling efficiency is increased with an increase in the amount of air used for ventilation cooling of the inside of the nacelle 3. Such an increase in the cooling efficiency is also effective for reducing the capacity of the ventilation fan.

FIGS. 6A, 6B, 7A, and 7B show a first modification according to the above-described second embodiment. In this case, the rearward side air inlets 35A are positioned at upper rearward portions of the nacelle side faces 3a. That is, the rearward side air inlets 35A are disposed at positions that are near the rear end of the equipment E disposed inside the nacelle 3 and are near the upper end of the nacelle side faces 3a. Also in this modification, door members 36A are provided for selecting an open or closed state where only the side air inlets 34 or the rearward side air inlets 35A are opened.

Figure 6A:
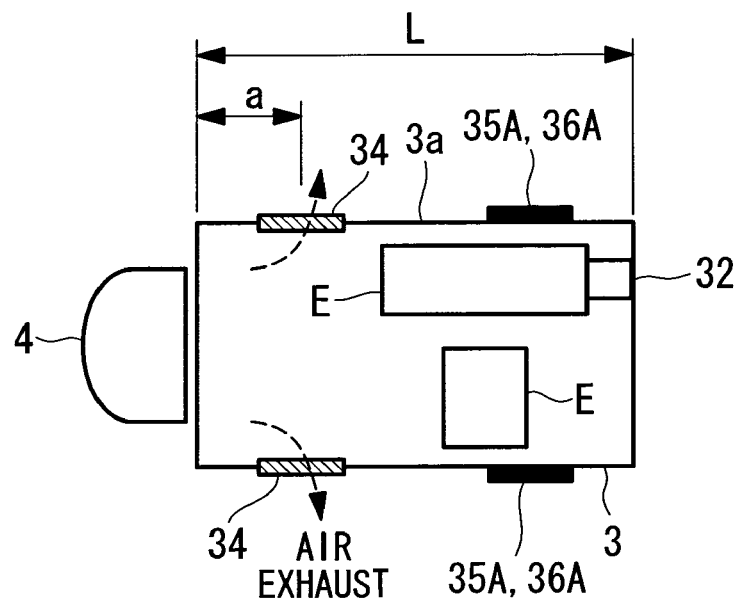
FIG. 6A is a plan view illustrating a nacelle configuration during a shutdown period at a low outside air temperature in a first modification of the second embodiment.
Figure 6B:
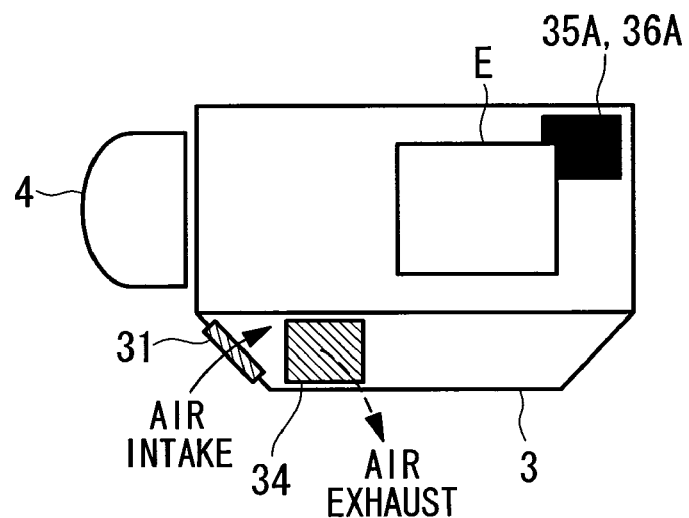
FIG. 6B is a side view illustrating a nacelle configuration during a shutdown period at a low outside air temperature in the first modification of the second embodiment.
Figure 7A:
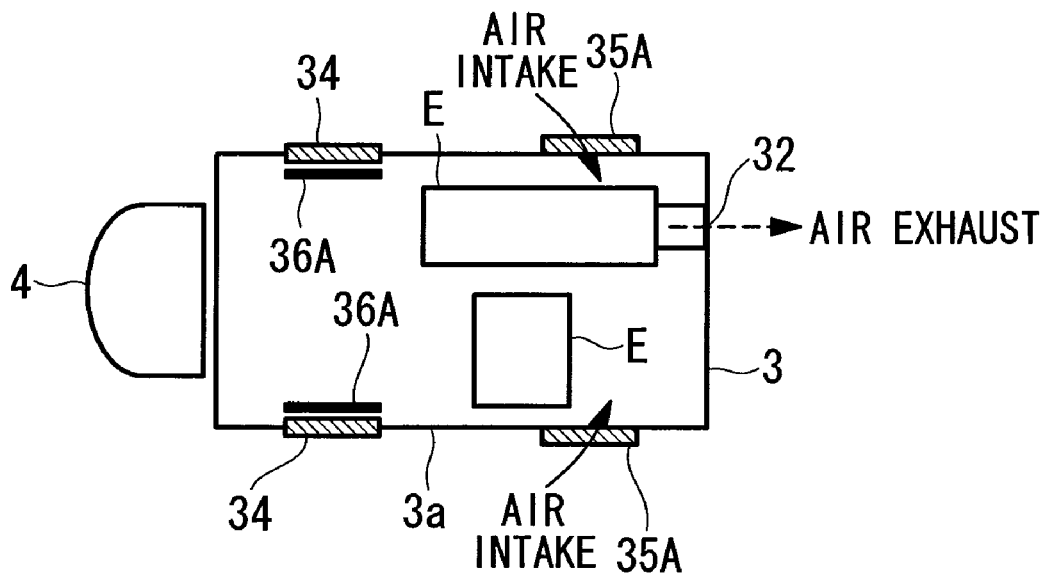
FIG. 7A is a plan view illustrating a nacelle configuration during operation at a high outside air temperature in the first modification of the second embodiment.
Figure 7B:
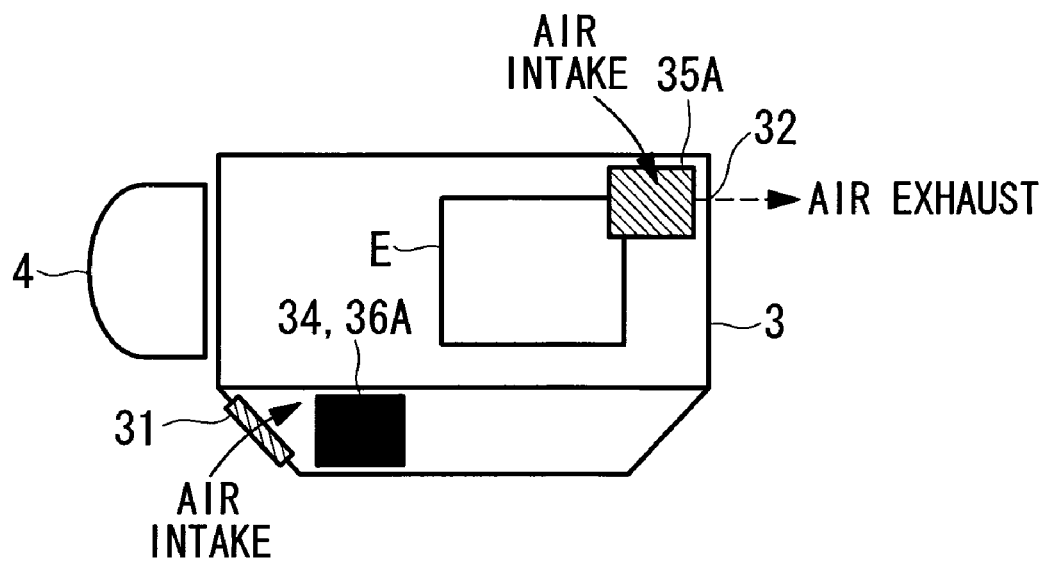
FIG. 7B is a side view illustrating a nacelle configuration during operation at a high outside air temperature in the first modification of the second embodiment.

For example, as shown in FIGS. 7A and 7B, when the outside air temperature is high, the thus arranged rearward side air inlets 35A can efficiently ventilate the high-temperature upper rearward region inside the nacelle by closing the side air inlets 34 and opening the rearward side air inlets 35A. Furthermore, the state shown in FIGS. 6A and 6B is, as in the above-described embodiment shown in FIGS. 4A and 4B, a state where the wind turbine generator system 1 installed in an environment with low outside air temperature is not driven.

FIGS. 8A, 8B, 9A, and 9B show a second modification of the above-described second embodiment. The switching means in this case employs hinged door members 37a and 37b.

The door members 37a are attached to the side air inlets 34. The door members 37a are front supporting swing members and are openable outward at the nacelle rear side by using the front side of the nacelle 3 as a fulcrum. The door members 37b are attached to the rearward side air inlets 35. The door members 37b are rear supporting swing members and are openable outward at the nacelle front side by using the rear side of the nacelle 3 as a fulcrum.

Figure 8A:
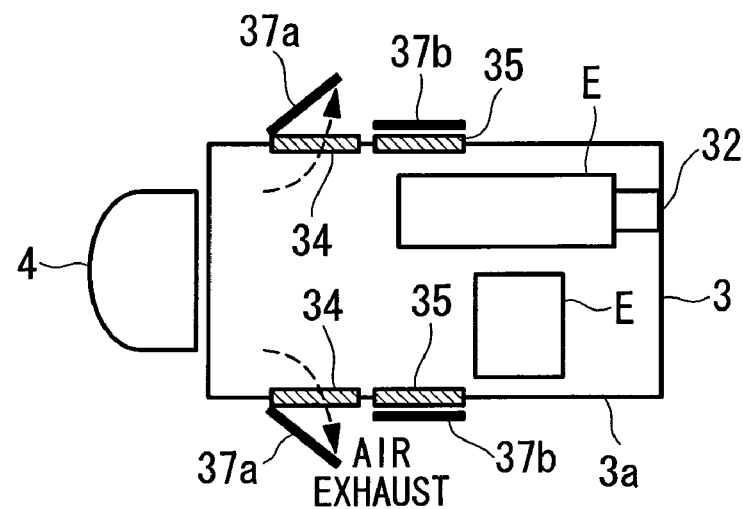
FIG. 8A is a plan view illustrating a nacelle configuration during a shutdown period at a low outside air temperature in a second modification of the second embodiment.
Figure 8B:
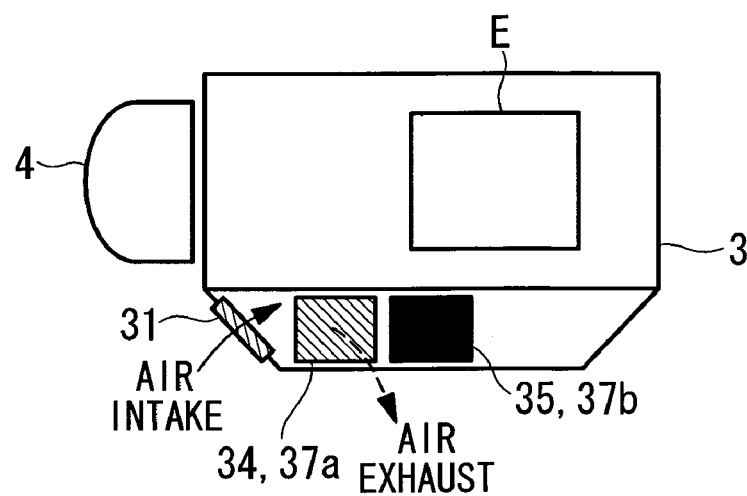
FIG. 8B is a side view illustrating a nacelle configuration during a shutdown period at a low outside air temperature in the second modification of the second embodiment.

In such a configuration, for example, as shown in FIGS. 8A and 8B, the air exhaust efficiency can be increased with an increase in the negative pressure by manipulating the door members 37a to open the side air inlets 34. That is, since the door members 37a in the opened state change the flow of outside air flowing along the nacelle side faces 3a to an outward direction, a negative pressure acting to take air from the inside of the nacelle 3 to the outside of the nacelle 3 can be increased.

Figure 9A:
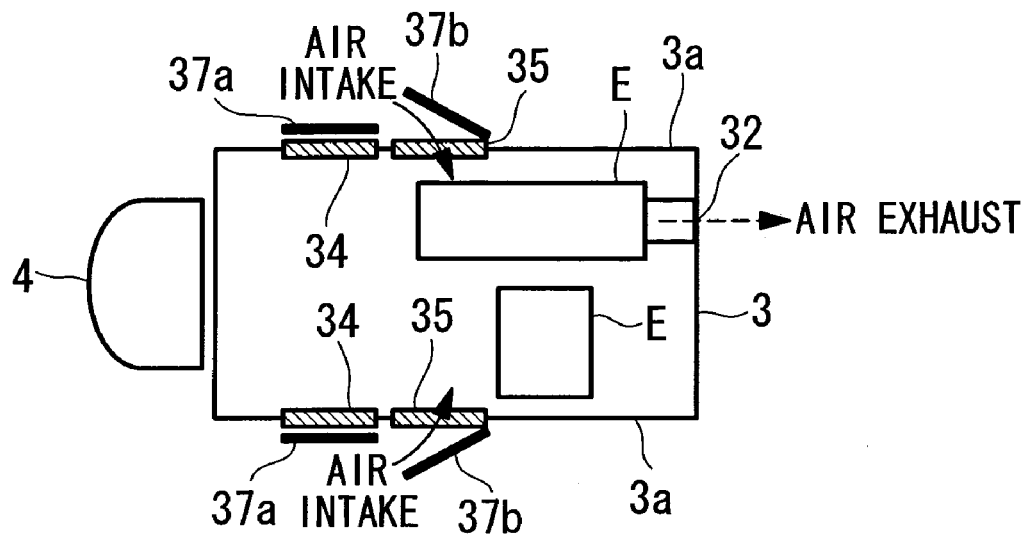
FIG. 9A is a plan view illustrating a nacelle configuration during operation at a high outside air temperature in the second modification of the second embodiment.
Figure 9B:
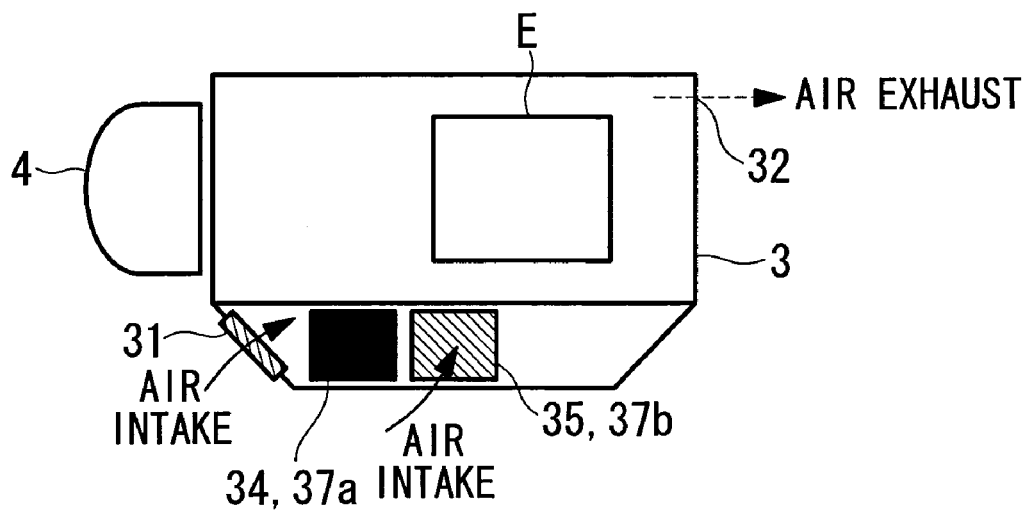
FIG. 9B is a side view illustrating a nacelle configuration during operation at a high outside air temperature in the second modification of the second embodiment.

In addition, for example, as shown in FIGS. 9A and 9B, air intake into the inside of the nacelle 3 can be conducted by scooping the flow of outside air by manipulating the door members 37b to open the rearward side air inlets 35. That is, since the door members 37b in the opened state change the flow of outside air flowing along the nacelle side faces 3a toward the inside of the nacelle 3, the air intake efficiency of taking outside air to the inside of the nacelle 3 can be increased.

Figure 10:
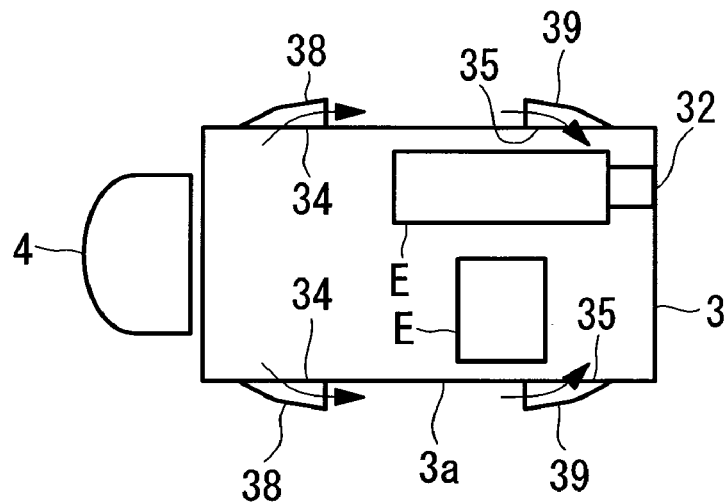
FIG. 10 is a plan view illustrating a nacelle configuration in a third modification of the second embodiment.

FIG. 10 shows a third modification of the above-described second embodiment. In this modification, front hood members 38 that are closed at the nacelle front side and opened at the nacelle rear side are attached to the outsides of the side air inlets 34, and rear hood members 39 that are opened at the nacelle front side and closed at the nacelle rear side are attached to the outsides of the rearward side air inlets 35.

In such a configuration, by manipulating, for example, the door members 36 (not shown) to open the side air inlets 34, the air exhaust efficiency can be increased due to the increase in negative pressure caused by the front hood members 38, due to the same effect as that of the door members 37a in the above-described second modification.

In addition, by manipulating, for example, the door members 36 (not shown) to open the rearward side air inlets 35, the air intake efficiency can be increased by taking in air with the rear hood members 39 so as to scoop the flow of outside air, due to the same effect as that of the door members 37b in the above-described second modification.

Figure 11:
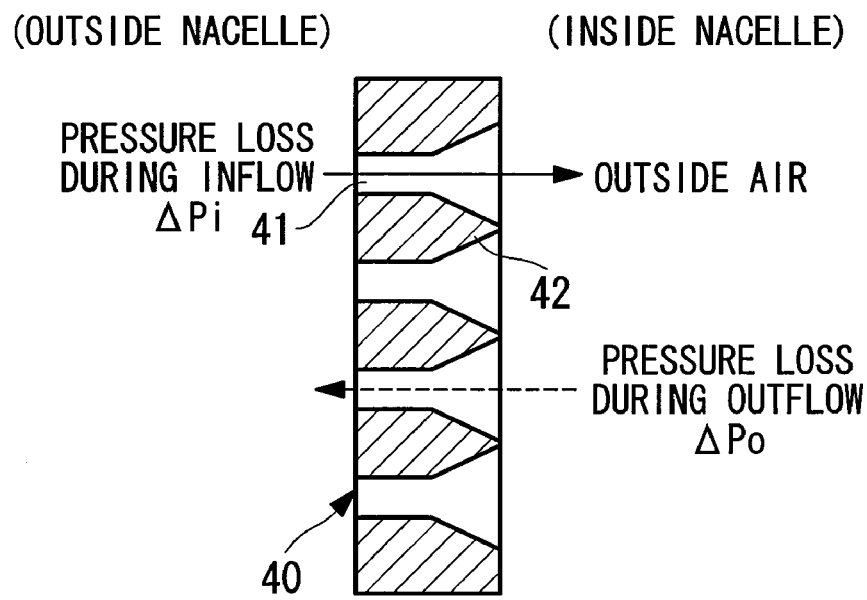
FIG. 11 is a cross-sectional view illustrating the configuration of a louver provided at an air inlet of the wind turbine generator system according to the present invention.

In the above-described embodiments and their modifications, for example, as shown in FIG. 11, the air inlet is provided with a louver 40 having a cross-sectional channel shape in which the inlet opening area at the outflow side is larger than that at the inflow side. The louver 40 is also called a louver panel or louver window.

The louver 40 shown in FIG. 11 is provided with outside air channels 41 having a larger channel cross-section area at the nacelle outflow side facing the inside of the nacelle compared with that at the outside-air-inflow side facing the outside of the nacelle. In these outside air channels 41, the inlet opening area is enlarged by forming the cross-sections of the tips, at the nacelle outflow side, of a large number of channel-forming members 42 arranged at a predetermined pitch in the vertical direction as acute-angled triangles.

Adoption of such a louver 40 can make the pressure loss $\Delta Po$ during outflow smaller than the pressure loss $\Delta Pi$ during inflow. That is, when the ventilation fan is not driven, the channel resistance of outside air flowing inside of the nacelle 3 through the louver 40 becomes larger than the channel resistance of air flowing out from the inside of the nacelle 3. Consequently, in the wind turbine generator system installed in a cool region, hardly any low-temperature outside air flows inside the nacelle 3 during a shutdown period, resulting in suppression of the internal temperature drop of the nacelle 3.

Figure 12:
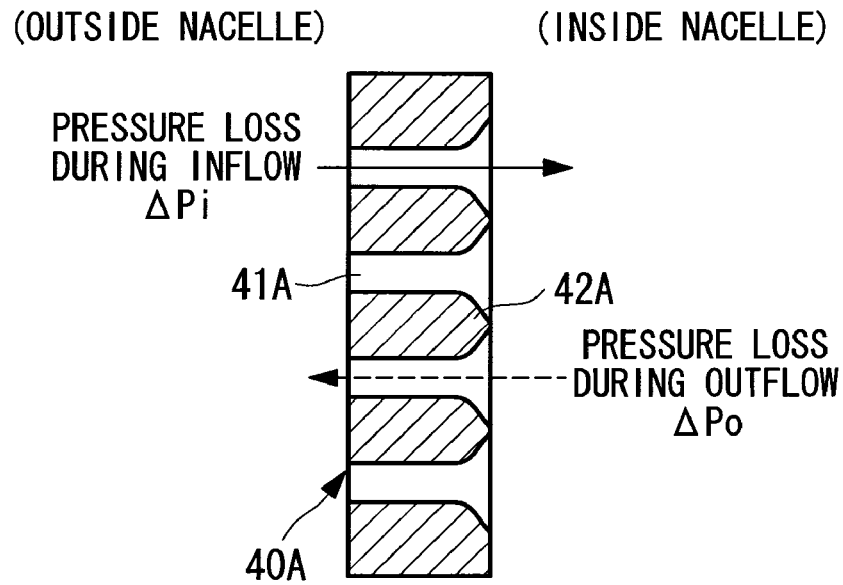
FIG. 12 is a cross-sectional view illustrating a first modification of the louver configuration shown in FIG. 11.

Furthermore, the louver 40A shown in FIG. 12 is a modification of the louver 40 shown in FIG. 11. In the louver 40A in this case, a large number of channel-forming members 42A are arranged at a predetermined pitch in the vertical direction to form a large number of outside air channels 41A. The inlet opening area is enlarged by forming the cross-sections of the tips, at the nacelle outflow side, of the channel-forming members 42A approximately as triangles that narrow along curved surfaces.

Figure 13:
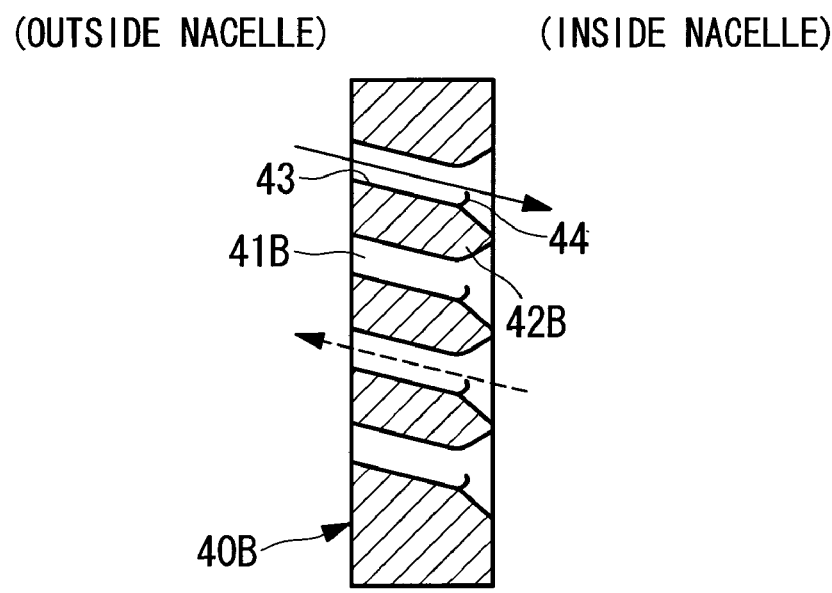
FIG. 13 is a cross-sectional view illustrating a second modification of the louver configuration shown in FIG. 11.
Figure 14:
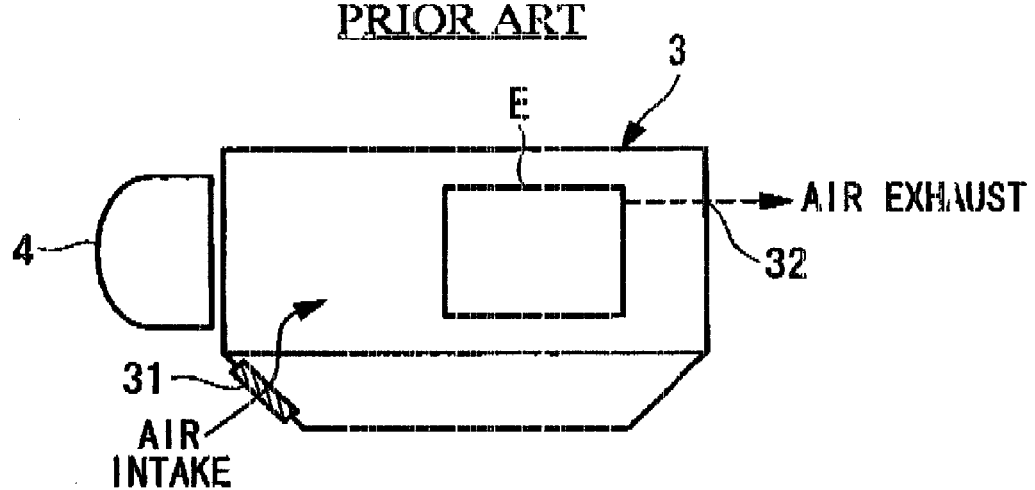
FIG. 14 is a plan view illustrating a nacelle configuration during operation of a conventional wind turbine generator system.
Figure 15:
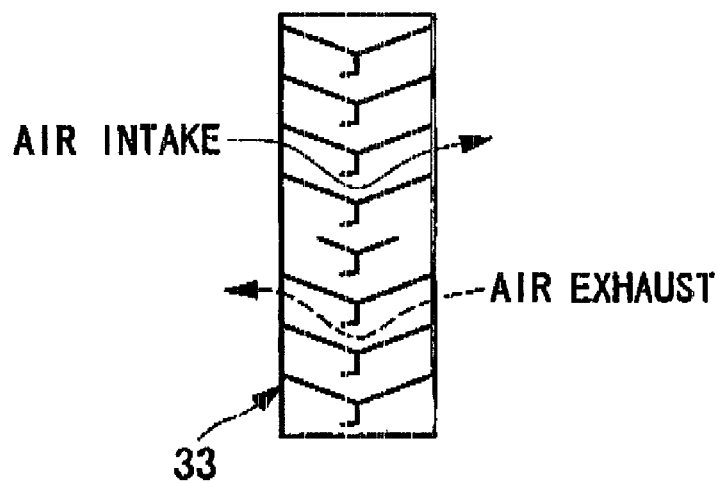
FIG. 15 is a cross-sectional view illustrating the configuration of a conventional louver provided at an air inlet of a wind turbine generator system.

Furthermore, the louver 40B shown in FIG. 13 is a modification of the louvers 40 and 40A shown in FIGS. 11 and 12. In this case, the outside air channels 41B formed in the louver 40B have a cross-sectional shape inclining such that the shaft center line descends from the inflow side to the outflow side, and the wall 43 of a channel-forming member 42B forming the channel cross-section is provided with a gutter 44 at a lower portion thereof.

With such a configuration, rain water infiltrating from the louver 40B to the inside of the nacelle 3 is collected in the gutter 44 by the incline of the lower wall 43. This rain water can be drained outside the nacelle 3 by being guided by the gutter 44.

Thus, in the above-described wind turbine generator system 1 of the present invention, the inside of the nacelle 3 can be cooled irrespective of the outside air temperature in various installation environments even if the conditions, such as the outside air temperature, vary depending on the installation site and the season. That is, in the state where the internal temperature of the nacelle 3 is increased, the inside can be cooled by efficient ventilation, and in the state where the temperature of the nacelle interior is decreased, for example, in a cool region, a temperature drop can be minimized with reduced ventilation.

The present invention is not limited to the above-mentioned embodiments and can be suitably modified without departing from the scope of the present invention.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A wind turbine generator system comprising:
a rotor head provided with wind turbine blades;
equipment of a drive mechanism and an electricity generation mechanism that are coupled to the rotor head;
a nacelle in which the equipment is disposed;
an air inlet provided in a front face of the nacelle;
an air outlet provided on the nacelle;
a ventilation fan provided in the nacelle and having a fan outlet communicated with the air outlet to exhaust air introduced from the air inlet through the air outlet to an outside of the nacelle, to perform ventilation cooling of the equipment;
a side air inlet provided in a side face of the nacelle at a position where a negative pressure is generated by air flowing outside the nacelle;
a rearward side air inlet provided in the side face of the nacelle at a position that is located rearward of the nacelle with respect to the side air inlet and where the negative pressure is eliminated; and
switching means for selecting an open or closed state of the side air inlet and the rearward side air inlet.

2. The wind turbine generator system according to claim 1, wherein the rearward side air inlet is positioned at an upper rearward portion of the side face of the nacelle.

3. The wind turbine generator system according to claim 1, wherein the switching means is provided with a front supported swing member that is attached to the side air inlet and is openable outward toward the rear side of the nacelle by using a front portion of the side face of the nacelle as a fulcrum and a rear supported swing member that is attached to the rearward side air inlet and is openable outward toward the front side of the nacelle using a rear portion of the side face of the nacelle as a fulcrum.

4. The wind turbine generator system according to claim 1, comprising a front hood member that is attached to the outside of the side air inlet and that is closed at the nacelle front side and opened toward the nacelle rear side and a rear hood member that is attached to the outside of the rearward side air inlet and that is opened toward the nacelle front side and closed at the nacelle rear side.

5. The wind turbine generator system according to claim 1, wherein the air inlet includes a louver having a cross-sectional channel shape in which an inlet opening area at an outflow side is larger than that at an inflow side.

6. The wind turbine generator system according to claim 1, wherein the air inlet includes a louver having a cross-sectional channel shape in which an inlet opening area at an outflow side is larger than that at an inflow side.

7. The wind turbine generator system according to claim 1, wherein, when a longitudinal length of the nacelle is defined as L and the length from the front face of the nacelle to a central axis of the side inlet in a longitudinal direction of the nacelle is defined as a, the side inlet is disposed such that $a = 0.1\ L \sim 0.3\ L$.

8. The wind turbine generator system according to claim 1, wherein,
when a longitudinal length of the nacelle is defined as L and the length from the front face of the nacelle to a central axis of the side inlet in a longitudinal direction of the nacelle is defined as a, the side inlet is disposed such that $a = 0.1\ L \sim 0.3\ L$, and
when the length from the front face of the nacelle to a central axis of the rearward side inlet in the longitudinal direction of the nacelle is defined as b, the rearward side inlet is disposed such that $b = 0.5\ L \sim 0.8\ L$.

9. The wind turbine generator system according to claim 2, wherein the air inlet includes a louver having a cross-sectional channel shape in which an inlet opening area at an outflow side is larger than that at an inflow side.

10. The wind turbine generator system according to claim 3, wherein the air inlet includes a louver having a cross-sectional channel shape in which an inlet opening area at an outflow side is larger than that at an inflow side.

11. The wind turbine generator system according to claim 4, wherein the air inlet includes a louver having a cross-sectional channel shape in which an inlet opening area at an outflow side is larger than that at an inflow side.

12. The wind turbine generator system according to claim 5, wherein the cross-sectional channel shape inclines such that a center line of the cross-sectional channel shape descends from the inflow side to the outflow side, and a wall forming the channel cross-section is provided with a gutter at a lower portion thereof.

13. The wind turbine generator system according to claim 7, wherein the entirety of the side inlet is disposed within a range of $0.1\ L \sim 0.3\ L$.

14. A wind turbine generator system, comprising:
a rotor head provided with wind turbine blades;
equipment of a drive mechanism and an electricity generation mechanism that are coupled to the rotor head;
a nacelle in which the equipment is disposed and which includes
a front face behind the rotor head,
a top face facing the sky,
a bottom face facing the ground, and
a side face connecting the top and bottom faces and extending rearwardly from the front face;
an air inlet provided through the front face of the nacelle;
an air outlet provided on the nacelle;
a ventilation fan provided in the nacelle and having a fan outlet communicated with the air outlet to exhaust air introduced from the air inlet through the air outlet to an outside of the nacelle, to perform ventilation cooling of the equipment; and
a side air inlet provided through the side face of the nacelle in a negative-pressure region where a flow direction of an air flow outside the nacelle rearwardly from the rotor head is changed by being affected by edges of the front face of the nacelle such that the air flow is separated from the side face of the nacelle to generate a negative pressure.

15. The wind turbine generator system according to claim 14, wherein
when the ventilation fan is not in operation, the negative pressure in the negative-pressure region is more negative than a pressure inside the nacelle, thereby causing the air inside the nacelle to exhausted through the side air inlet, and
the ventilation fan is arranged to, in operation, create a negative pressure more negative than the negative pressure in the negative-pressure region, thereby causing the air outside the nacelle to enter the nacelle through the side air inlet.

16. The wind turbine generator system according to claim 15, wherein
the side air inlet is positioned adjacent to and rearward of the air inlet to, when the ventilation fan is not in operation, enable air entering the nacelle through the air inlet to directly flow out from the side air inlet without circulating inside the nacelle.

17. The wind turbine generator system according to claim 14, wherein
the air inlet and the side air inlet are co-elevational.

* * * * *